M. W. ALEXANDER.
BRUSH.
APPLICATION FILED AUG. 24, 1915.

1,364,971. Patented Jan. 11, 1921.

Inventor
Milton W. Alexander,
By Frank C. Curtis
Attorney

UNITED STATES PATENT OFFICE.

MILTON W. ALEXANDER, OF ALBANY, NEW YORK, ASSIGNOR, BY MESNE ASSIGNMENTS, TO HENRY L. HUGHES CO., INC., OF NEW YORK, N. Y., A CORPORATION OF NEW YORK.

BRUSH.

1,364,971.  Specification of Letters Patent.  Patented Jan. 11, 1921.

Application filed August 24, 1915. Serial No. 47,180.

*To all whom it may concern:*

Be it known that I, MILTON W. ALEXANDER, a citizen of the United States, residing at Albany, county of Albany, and State of New York, have invented certain new and useful Improvements in Brushes, of which the following is a specification.

Reference may be had to the accompanying drawings, and the reference characters marked thereon, which form a part of this specification. Similar characters refer to similar parts in the several figures therein.

This invention relates to a type of toilet-brush having bristles mounted in a flexible, elastic rubber pad.

A common form of brush of this type is a hair-brush having such a pad mounted and confined in convex form upon a brush-back with an air-chamber between the brush-pad and the back.

The principal object of the invention is to make the pad substantially integral and waterproof without interfering with its flexibility and elasticity.

Figure 1 of the drawings is a view in plan of a flexible sheet of vulcanized rubber perforated to receive the bristles.

Figure 1:
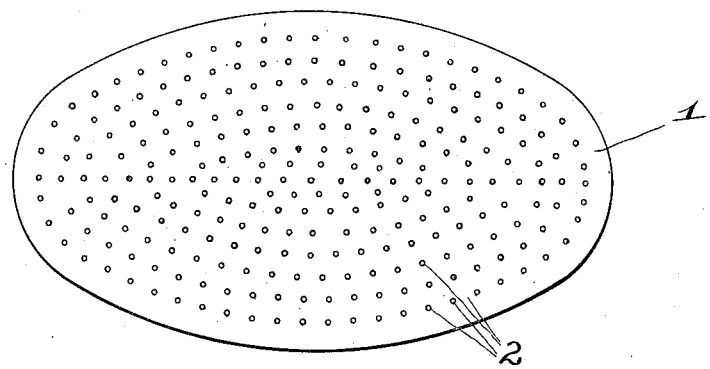
Figure 2:
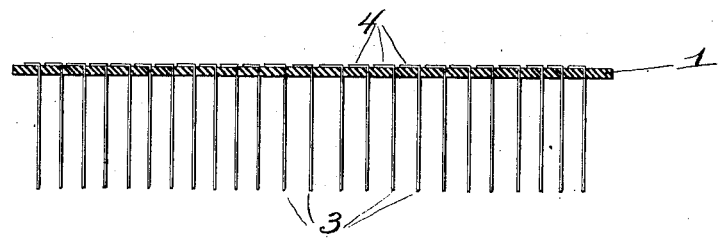
Fig. 2 is a cross-section of the same showing the bristles inserted through the perforations in the sheet with the heads formed by bending over the ends of the bristles exposed upon the back of the sheet.
Figure 3:
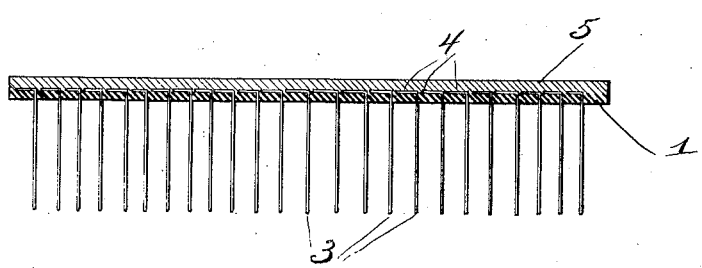
Fig. 3 is a cross-sectional view showing the heads of the bristles sealed or hermetically embedded in the integral flexible rubber pad formed by vulcanizing upon the rubber sheet, shown in Fig. 2, a rubber backing-sheet.
Figure 4:
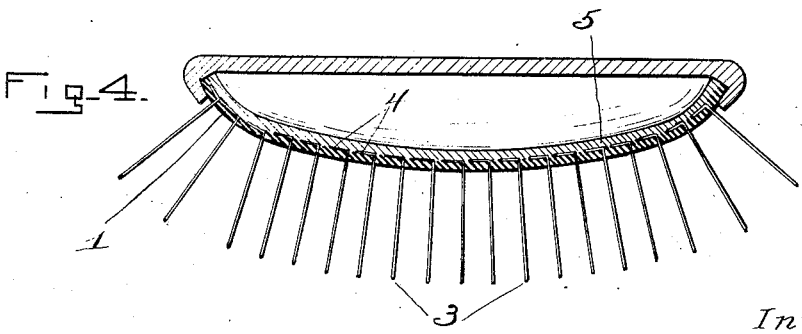
Fig. 4 is a view in cross section showing the pad confined in convex form upon a brush-back.

Referring to the drawings wherein the invention is shown in preferred form, 1 is a flexible sheet of vulcanized rubber provided with numerous perforations, 2, each adapted to receive one or more bristles as may be desired.

This sheet is formed by vulcanizing the rubber to a degree adapting it to form an elastic support for the bristles, and is preferably provided with the perforations, 2, after being so vulcanized.

The bristles, 3, are inserted singly, or in groups comprising two or more, through the perforations, 2, said bristles having, on their inner ends, heads, 4, formed in any known manner, preferably by bending over at right angles the inner end of each bristle.

Upon the back of the bristle-filled sheet thus prepared is placed a backing-sheet, 5, of unvulcanized or semi-vulcanized rubber covering the heads, 4, of the bristles, which backing-sheet is then vulcanized upon the bristle-supporting sheet, 1, until the two rubber sheets, 1 and 5, form an integral flexible body of vulcanized rubber.

In making the brush-pad by the method described, I prefer to vulcanize the two sheets together at a temperature somewhat less than the temperature at which the bristle-supporting sheet was previously vulcanized, leaving said bristle-supporting sheet unaffected by such subsequent vulcanization with respect to its flexibility and elasticity.

By the process described, the inner ends of the bristles, and particularly their heads, are hermetically sealed or embedded in an integral body of soft rubber, and are thereby protected from moisture; and there being no seam or joint in the finished pad, there is no tendency for the backing-sheet to separate from the bristle-supporting sheet.

The brush-pad thus formed may be itself used as a brush or it may be mounted in any known manner upon a suitable brush-back or handle.

The brush-pad made in accordance with this invention has its front surface through which the bristles project and which is exposed in use, vulcanized to a greater degree than its back surface.

What I claim as new and desire to secure by Letters Patent is—

1. A brush-pad of the class described, comprising two rubber sheets vulcanized into an integral body of soft rubber having bristles projecting from one of said sheets, said bristles being formed with heads embedded in the integral body formed by said vulcanized-together sheets.

2. An elastic brush-pad comprising an integral body of flexible vulcanized rubber vulcanized to a greater degree on one side than on the other, and bristles projecting from the more highly vulcanized side of the pad, said bristles having heads embedded in and wholly inclosed by the pad.

3. A brush-pad of the class described, comprising two rubber sheets vulcanized into an integral body of soft rubber having bristles projecting from one of said sheets, said bristles being formed with heads embedded in the integral body formed by said vulcanized-together sheets, in combination with a supporting back whereby said pad is held in upwardly convexed form.

4. A brush-pad of the class described comprising two rubber sheets vulcanized into an integral body of soft rubber having bristles projecting from one of said sheets said bristles being formed with heads embedded in the integral body formed by said vulcanized-together sheets; in combination with a supporting back having walls surrounding an area of less dimensions than said pad, said pad being held in convexed form by engagement of its edges with said walls.

In testimony whereof, I have hereunto set my hand this 23rd day of August, 1915.

MILTON W. ALEXANDER.